United States Patent [19]

Kawamura

[11] Patent Number: 4,942,851
[45] Date of Patent: Jul. 24, 1990

[54] ELECTROMAGNETIC VALVE CONTROL SYSTEM

[75] Inventor: Hideo Kawamura, Kanagawa, Japan

[73] Assignee: Isuzu Ceramics Research Co., Ltd., Kanagawa, Japan

[21] Appl. No.: 435,942

[22] Filed: Nov. 13, 1989

[30] Foreign Application Priority Data

Nov. 11, 1988 [JP] Japan ................................ 63-285373

[51] Int. Cl.$^5$ ............................................ F01L 9/04
[52] U.S. Cl. ............................. 123/90.11; 123/90.15
[58] Field of Search ............ 123/90.11, 90.15, 188 AA

[56] References Cited

U.S. PATENT DOCUMENTS

| 3,682,152 | 8/1972 | Muller-Berner | 123/90.11 |
| 4,359,022 | 11/1982 | Nakamura et al. | 123/188 AA |
| 4,544,986 | 10/1985 | Büchl | 123/90.11 |
| 4,598,675 | 7/1986 | Long | 132/90.51 |
| 4,614,170 | 9/1986 | Pischinger et al. | 123/90.11 |
| 4,700,684 | 10/1987 | Pischinger et al. | 132/90.11 |
| 4,722,315 | 2/1988 | Pickel | 123/90.11 |
| 4,829,947 | 5/1989 | Lequesne | 123/90.11 |
| 4,831,973 | 5/1989 | Richeson, Jr. | 123/90.11 |
| 4,841,923 | 6/1989 | Büchl | 123/90.11 |
| 4,846,120 | 7/1989 | Büchl | 123/90.11 |

Primary Examiner—David A. Okonsky
Assistant Examiner—Weilun Lo
Attorney, Agent, or Firm—Staas & Halsey

[57] ABSTRACT

An electromagnetic valve control system includes electromagnets having fixed magnetic poles facing opposite end surfaces of a reciprocally movable magnetic plate which is coupled to each of intake and exhaust valves. The intake and exhaust valves can be opened and closed under electromagnetic attractive forces produced by energizing the electromagnets. When the rotational speed of an engine incorporating the electromagnetic valve control system is lower than a predetermined speed, the intake and exhaust valves are opened and closed at a timing close to the top dead center and the bottom dead center of an engine cylinder associated with the intake and exhaust valves. The speeds of flow of intake air and exhaust gases are detected, and when the rotational speed of the engine is higher than the predetermined speed, the timing of closing the intake and exhaust valves is modified such that the intake and exhaust valves will be closed at the time the speeds of flow of intake air and exhaust gases become zero.

14 Claims, 2 Drawing Sheets

ELECTROMAGNETIC VALVE CONTROL SYSTEM

BACKGROUND OF THE INVENTION

The present invention relates to an electromagnetic valve control system for electromagnetically controlling a valve to open and close an intake or exhaust port through which the interior and exterior of an engine cylinder communicate with each other.

When fuel is burned in combustion chambers in the cylinders of an engine, the pistons in the cylinders are successively lowered to cause the connecting rods to rotate the crankshaft. A conventional control system for controlling intake and exhaust valves for introducing an air-fuel mixture into and discharging exhaust gases from the combustion chambers includes a camshaft rotatable about its own axis by the crankshaft through a timing belt and pulleys. The intake and exhaust valves are moved to open and close intake and exhaust ports by rocker arms slidably held against cam surfaces of the camshaft.

While the engine is in operation, it is not possible to vary the timing at which the intake and exhaust valves open and close the intake and exhaust ports. Therefore, the timing of opening and closing the intake and exhaust ports with the intake and exhaust valves is selected such that the engine operates with high efficiency when it rotates at a certain speed.

More specifically, an intake valve is opened a crankshaft angle ranging from 20° to 30° ahead of the top dead center (TDC) of the associated piston, and closed a crankshaft angle ranging from 50° to 60° after the bottom dead center (BDC) of the piston.

An exhaust valve is opened a crankshaft angle ranging from 50° to 60° ahead of the bottom dead center of the piston, and closed a crankshaft angle ranging from 20° to 30° after the top dead center of the piston.

With such timing settings, however, the intake valve remains open for a certain period of time after the bottom dead center. When the engine speed is low, since the inertial force of intake air is small, an air-fuel mixture which is once introduced into the cylinder tends to flow back out of the cylinder through the intake port during that period of time. As a result, the engine power output is reduced. Conversely, when the engine speed is high, because the inertial force of intake air is large, intake air continuously flows into the cylinder even after the piston has started to move up in the compression stroke. Since the intake valve is then closed while intake air is still flowing into the cylinder, the volumetric efficiency is lowered, and so is the engine power output.

Japanese Laid-Open Patent Publications Nos. 58-183805 and 61-76713 disclose valve control systems for actuating intake and exhaust valves with electromagnetic means. However, the disclosed valve control systems have not been addressed to the above problems.

SUMMARY OF THE INVENTION

In view of the aforesaid problems of the conventional valve control system, it is an object of the present invention to provide an electromagnetic valve control system for modifying the timing of opening and closing intake and exhaust valves so as to be near the top dead center and bottom dead center of an associated piston in an engine cylinder when the rotational speed of the engine is lower than a predetermined speed level and for also correcting the timing of closing the intake valve so that it will be closed at the time a detected speed of flow of intake air is reduced to zero when the rotational speed of the engine is higher than the predetermined speed level, whereby an air-fuel mixture is prevented from flowing back out of the cylinder in a low engine speed range and the volumetric efficiency of the engine is increased in medium and high engine speed ranges, for thereby increasing the engine power output.

According to the present invention, there is provided an electromagnetic valve control system for controlling the timing of opening and closing an intake valve in an internal combustion engine, comprising a magnetic plate adapted to be connected to the intake valve, the magnetic plate being reciprocally movable in a direction, electromagnets having fixed magnetic poles facing end surfaces of the magnetic plate in the direction, a flow speed sensor for detecting the speed of flow of intake air toward the intake valve in the internal combustion engine, valve opening and closing means for opening and closing the intake valve under attractive forces produced between the magnetic plate and the fixed magnetic poles by energizing the electromagnets, and timing modifying means for modifying the timing of closing the intake valve such that the intake valve will be closed by the valve opening and closing means at the time the speed of flow of intake air as detected by the flow speed sensor becomes zero.

According to the present invention, there is also provided an electromagnetic valve control system for controlling the timing of opening and closing intake and exhaust valves in an internal combustion engine, comprising magnetic plates adapted to be connected respectively to the intake and exhaust valves, each of the magnetic plates being reciprocally movable in a direction, electromagnets having fixed magnetic poles facing end surfaces of the magnetic plate in the direction, flow speed sensors for respectively detecting the speed of flow of intake air toward the intake valve and the speed of flow of exhaust gases from the exhaust valve in the internal combustion engine, valve opening and closing means for opening and closing the intake and exhaust valves under attractive forces produced between the magnetic plate and the fixed magnetic poles by energizing the electromagnets, and timing modifying means for modifying the timing of closing the intake and exhaust valves such that the intake and exhaust valves will be closed by the valve opening and closing means at the time the speeds of flow of intake air and exhaust gases as detected by the flow speed sensors become zero.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
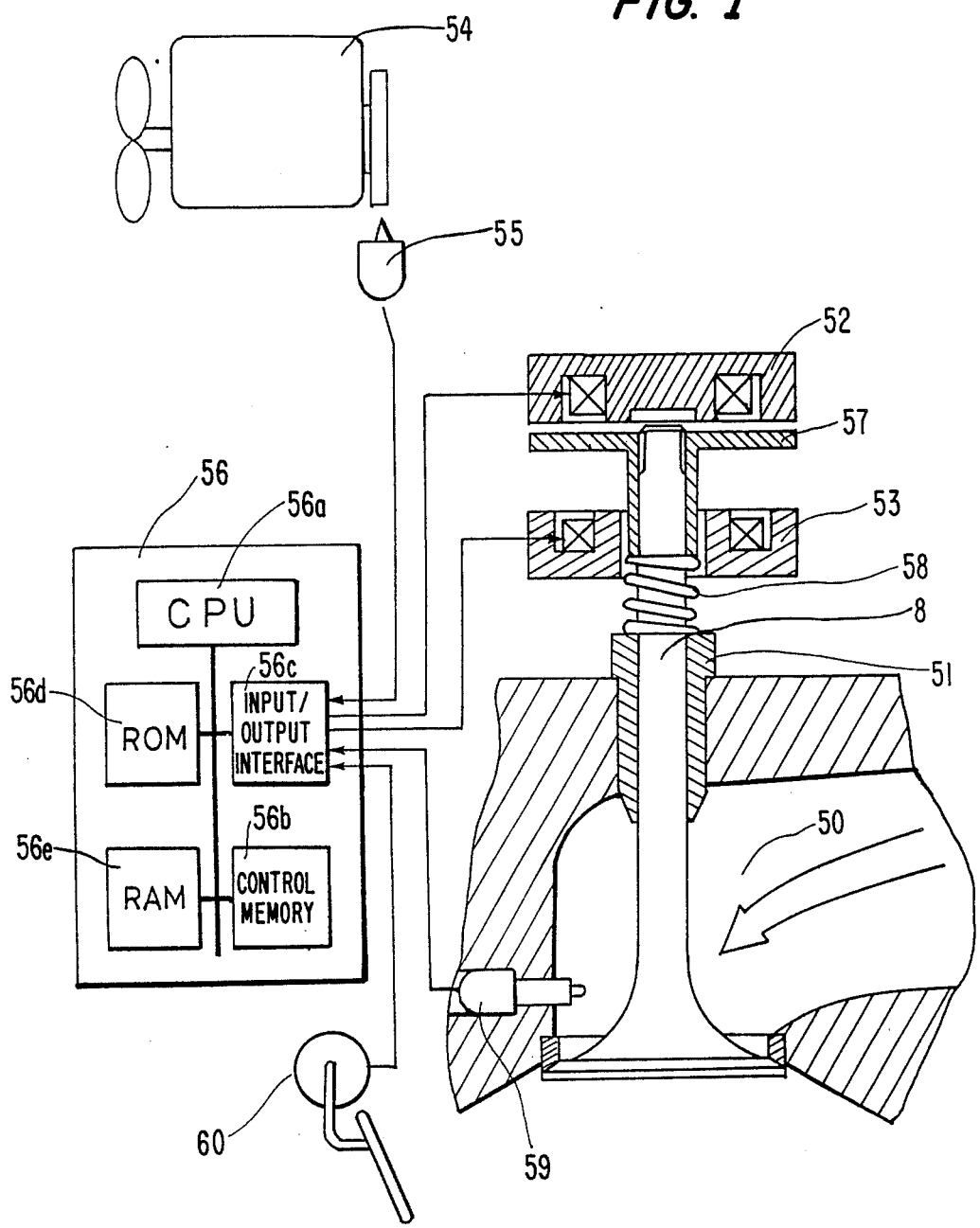
FIG. 1 is a schematic view, partly in block form, of an electromagnetic valve control system according to the present invention.

FIG. 1 shows an electromagnetic valve control system according to the present invention.

In FIG. 1, only an intake valve is shown by way of example. An exhaust valve is omitted from illustration as it is structurally identical to the intake valve.

As shown in FIG. 1, an internal combustion engine 54 has an intake valve 8 in each of the cylinders. The intake valve 8 is made of a ceramic material which is a heat-resistant high-strength material. A magnetic plate 57 made of a magnetic material is mounted on the upper end of the stem of the intake valve 8. The intake valve 8 is axially slidably held by a valve guide 51. Between the valve guide 51 and the magnetic plate 57, there is disposed a coil spring 58 around the valve stem for normally urging the intake valve 8 to prevent the intake valve 8 from being unseated or lowered when the engine 54 is stopped. The force of the spring 58 for biasing the intake valve 8 upwardly is sufficiently smaller than a force (described later on) for actuating the intake valve 8, so that the spring force will not prevent the intake valve 8 from being opened.

An upper circular electromagnet 52 is positioned above the magnetic plate 57, the upper electromagnet 52 having a fixed magnetic pole spaced a small distance from the upper surface of the magnetic plate 57 when the intake valve 8 is closed. A lower circular electromagnet 53 is disposed below the magnetic plate 57, the lower electromagnet 53 having a fixed magnetic pole spaced a predetermined distance from the magnetic plate 57 when the intake valve 8 is closed. The fixed magnetic poles of the upper and lower electromagnets 52, 53 are of unlike polarities. The upper and lower electromagnets 52, 53 have respective coils electrically connected to an input/output interface 56c of a control unit 56. The fixed magnetic poles of the upper and lower electromagnets 52, 53 can be energized when they are supplied with electric power from the input/output interface 56c.

To the input/output interface 56c, there are also connected a rotation sensor 55 for detecting the rotational speed and the crankshaft angle of the engine 54, a flow speed sensor 59 for detecting the speed of flow of intake air in an intake pipe 50 communicating with the intake port, and a load sensor 60 for detecting the depth to which an accelerator pedal is depressed.

The control unit 56 comprises, in addition to the input/output interface 56c, a central processing unit (CPU) 56a for effecting arithmetic operations according to a program and various settings stored in a ROM 56d, a random access memory (RAM) 56e for temporarily storing data, and a control memory 56b for controlling the operation of various components of the control unit 56.

Operation of the electromagnetic valve control system of the present invention will be described below.

The timing of opening and closing the intake and exhaust valves, which timing corresponds to the rotational speed of the engine 54 as detected by the rotation sensor 55, is fetched from the ROM 56d. The ROM 56d stores two timing settings, i.e., a high-speed timing setting and a low-speed timing setting. When the engine rotational speed is lower than a predetermined rotational speed stored in the ROM 56d, the low-speed timing setting is read from the ROM 56d. When the engine rotational speed is higher than the predetermined rotational speed, the high-speed timing setting is read from the ROM 56d.

According to the low-speed timing setting, the intake valve is closed at the top dead center of the piston, and closed at the bottom dead center thereof, and the exhaust valve is opened at the bottom dead center and closed at the top dead center.

According to the high-speed timing setting, the intake valve is closed a prescribed crankshaft angle after the bottom dead center, and the exhaust valve is opened the prescribed crankshaft angle ahead of the bottom dead center. The prescribed crankshaft angle, referred to above, is about 40°, but may be individually determined depending on the type of the engine 54 involved.

When the crankshaft angle of the engine 54 as detected by the rotation sensor 55 agrees with the timing read from the ROM 56d, the control unit 56 applies drive signals to the upper and lower electromagnets 52, 53. When the intake valve 8 is closed, the upper electromagnet 52 is energized to keep the intake valve 8 closed. When the timing of opening the intake valve 8 is reached, the upper electromagnet 52 is de-energized, and the lower electromagnet 53 is energized to actuate the intake valve 8 in an opening direction.

Upon elapse of a first preset angle from the valve opening timing, the lower electromagnet 53 is de-energized and the upper electromagnet is energized again. The speed at which the intake valve 8 moves in the opening direction is now reduced until the intake valve 8 is stopped, after which the intake valve 8 starts to move in a closing direction.

Upon elapse of a second present angle thereafter, the upper electromagnet 52 is de-energized again and the lower electromagnet 53 is energized. The speed at which the intake valve 8 moves in the closing direction is reduced, thus lessening shocks which the intake valve 8 undergoes when it is seated. After the intake valve 8 has been seated, the lower electromagnet 53 is de-energized and the upper electromagnet 52 is energized to keep the intake valve 8 closed until next valve opening timing is reached.

The amount of valve lift, i.e., the interval which the intake valve 8 moves, can be controlled by the magnitude of currents supplied to the upper and lower electromagnets 52, 53. The larger the currents, the greater the interval which the intake valve 8 moves. The time during which the intake valve 8 remains open is controlled by the first and second preset angles. The larger the first and second preset angles, the longer the time during which the intake valve 8 remains open.

If the speed of flow of intake air in the intake pipe 50 has not yet been reduced to zero at the timing of closing the intake valve 8, then the first and second preset angles are corrected so that they are increased. If the speed of flow of intake has been reduced to zero before the valve closing timing, then the first and second preset angles are corrected so that they are reduced. In this manner, the intake valve 8 can be closed at the time the intake air flow speed becomes zero.

Figure 2:
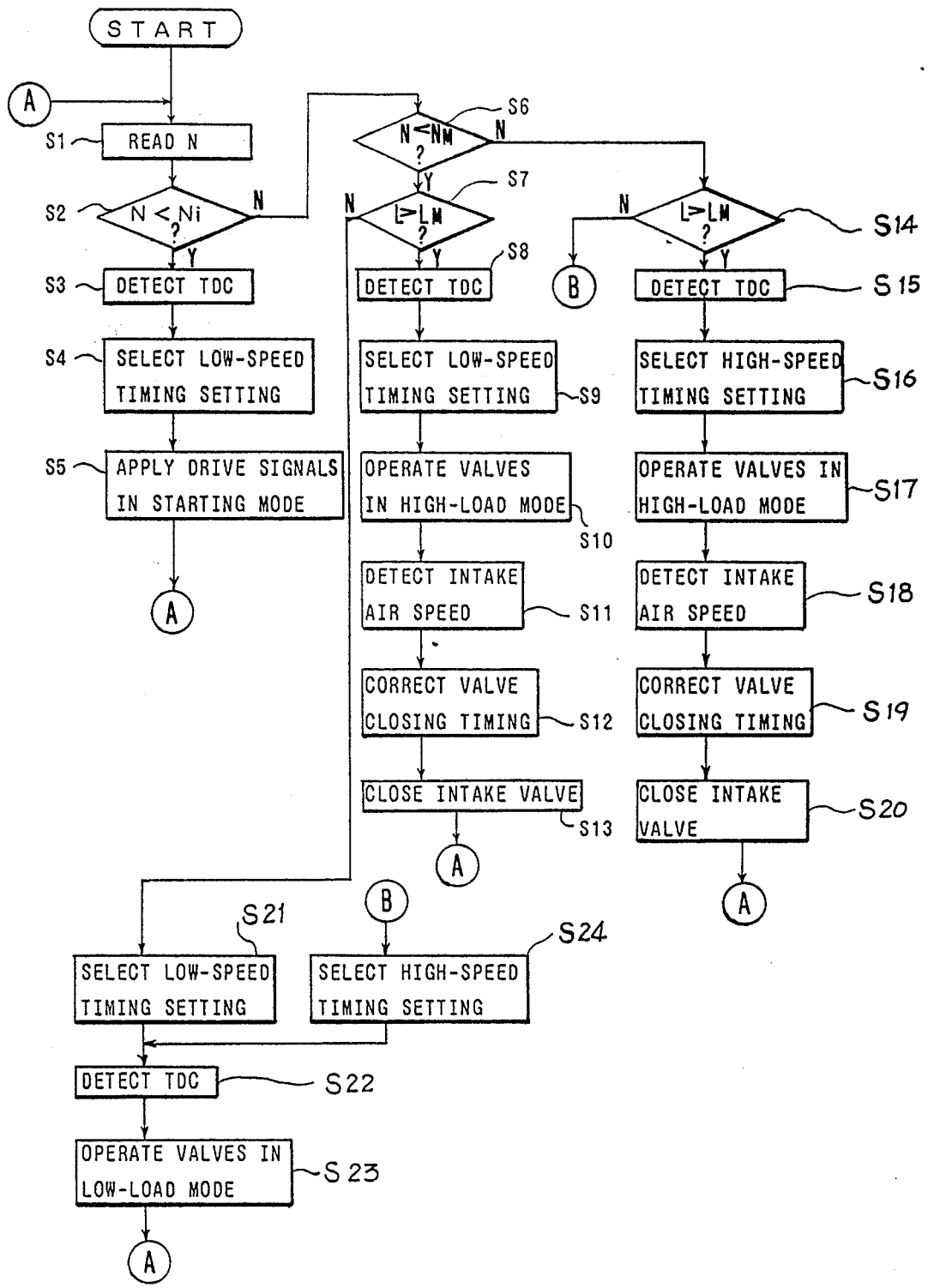
FIG. 2 is a flowchart of a control sequence executed by a control unit of the electromagnetic valve control system.

The above operation of the electromagnetic valve control system will be described with reference to the control sequence shown in FIG. 2 which is to be executed by the control unit 56.

The engine rotational speed N is read from the rotation sensor 55 in a step Sl, and then compared with an idling engine speed Ni stored in the ROM 56d in a step S2. If N<Ni, then control goes to a step S3 which detects the top dead center (TDC) from the crankshaft angle detected by the rotation sensor 55. The top dead center serves as a reference for opening and closing the intake and exhaust valves. Thereafter, the low-speed timing setting is selected as the timing of opening and closing the intake and exhaust valves in a step S4. Then, in a step S5, drive signals in a starting mode are applied to the electromagnets for opening and closing the intake and exhaust valves at the timing selected in the step S4. In the starting mode, the level of electric power supplied to the electromagnets is low, and hence the distance or interval by which the intake and exhaust valves move is small.

If $N \geq N_i$ in the step S2, then control goes to a step S6 in which the engine rotational speed N and a rotational speed $N_M$ stored in the ROM 56d are compared. If $N < N_M$, then control proceeds to a step S7, and if $N \geq N_M$, then control goes to a step S14.

The step S7 compares an engine load L determined from the amount of depression of the accelerator pedal as detected by the load sensor 60 and an engine load $L_M$ stored in the ROM 56d. IF $L \leq L_M$, then control goes to a step S21, and if $L > L_M$, then control proceeds to a step S8.

In the step S21, the low-speed timing setting is selected as the timing of opening and closing the intake and exhaust valves. The TDC is detected in a step S22, and the intake and exhaust valves are opened and closed in a low-load mode in a step S23. In the low-load mode, the level of electric power supplied to the electromagnets is slightly higher than that in the starting mode, and hence the interval by which the intake and exhaust valves move is of medium value.

When control goes from the step S7 to the step S8, the TDC is detected in the step S8, and the low-speed timing setting is selected as the timing of opening and closing the intake and exhaust valves. In a next step S10, the intake and exhaust valves are opened and closed in a high-load mode. In the high-load mode, the level of electric power supplied to the electromagnets is high, and the interval by which the intake and exhaust valves move is large.

When the intake valve 8 starts being opened, the speed of flow of intake air is detected in a step S11. The timing of closing the intake valve 8 is then corrected such that it will be closed at the time the speed of flow of intake air is reduced to zero. The intake valve 8 is then actually closed at the corrected timing in a step S13.

When control goes from the step S6 to the step S14, the engine load L and the stored engine load $L_M$ are compared in the step S14. If $L \leq L_M$, then control goes to a step S24, and if $L > L_M$, then control proceeds to a step S15.

In the step S24, the high-speed timing setting is selected as the timing of opening and closing the intake and exhaust valves. Thereafter, control goes to the step S22.

The step S15 and following steps S16 through S20 are the same as the steps S8 through S13 except that the high-speed timing setting is selected in the step S16.

From the steps S5, S13, S20, and S23, control returns to the step S1 to repeat the above process.

In the illustrated embodiment, for an easier understanding of the present invention, only the speed of flow of intake air is detected, and the timing of closing the intake valve is corrected such that it will be closed at the time the speed of flow of intake air is reduced to zero. However, the present invention also covers a mode of operation in which the speed of flow of exhaust gases is detected, and the timing of closing the exhaust valve is corrected such that it will be closed at the time the speed of flow of exhaust gases is reduced to zero.

Although a certain preferred embodiment has been shown and described, it should be understood that many changes and modifications may be made therein without departing from the scope of the appended claims.

What is claimed is:

1. An electromagnetic valve control system for controlling the timing of opening and closing an intake valve in an internal combustion engine, comprising:
   a magnetic plate adapted to be connected to the intake valve, said magnetic plate being reciprocally movable in a direction;
   electromagnets having fixed magnetic poles facing end surfaces of said magnetic plate in said direction;
   a flow speed sensor for detecting the speed of flow of intake air toward said intake valve in the internal combustion engine;
   valve opening and closing means for opening and closing the intake valve under attractive forces produced between said magnetic plate and said fixed magnetic poles by energizing said electromagnets; and
   timing modifying means for modifying the timing of closing the intake valve such that the intake valve will be closed by said valve opening and closing means at the time the speed of flow of intake air as detected by said flow speed sensor becomes zero.

2. An electromagnetic valve control system according to claim 1, further including a rotation sensor for detecting the rotational speed of the engine, said valve opening and closing means comprising means for modifying the timing of opening and closing the intake valve so as be close to the top dead center and the bottom dead center of an engine cylinder associated with the intake valve, in response to a reduction in the rotational speed of the engine as detected by said rotation sensor.

3. An electromagnetic valve control system according to claim 1, further including a load sensor for detecting the load on the engine, said valve opening and closing means comprising means for increasing the stroke by which the intake valve is opened and closed, in response to an increase in the load on the engine as detected by said load sensor.

4. An electromagnetic valve control system according to claim 1, wherein said valve opening and closing means comprises means for attracting said magnetic plate in a valve opening direction before the intake valve is seated, whereby shocks produced when the intake valve is seated are lessened.

5. An electromagnetic valve control system for controlling the timing of opening and closing intake and exhaust valves in an internal combustion engine, comprising:
   magnetic plates adapted to be connected respectively to the intake and exhaust valves, each of said magnetic plates being reciprocally movable in a direction;
   electromagnets having fixed magnetic poles facing end surfaces of said magnetic plate in said direction;
   flow speed sensors for respectively detecting the speed of flow of intake air toward said intake valve and the speed of flow of exhaust gases from said exhaust valve in the internal combustion engine;

valve opening and closing means for opening and closing the intake and exhaust valves under attractive forces produced between said magnetic plate and said fixed magnetic poles by energizing said electromagnets; and timing modifying means for modifying the timing of closing the intake and exhaust valves such that the intake and exhaust valves will be closed by said valve opening and closing means at the time the speeds of flow of intake air and exhaust gases as detected by said flow speed sensors become zero.

6. An electromagnetic valve control system according to claim 5, further including a rotation sensor for detecting the rotational speed of the engine, said valve opening and closing means comprising means for modifying the timing of opening and closing the intake and exhaust valves so as be close to the top dead center and the bottom dead center of an engine cylinder associated with the intake and exhaust valves, in response to a reduction in the rotational speed of the engine as detected by said rotation sensor.

7. An electromagnetic valve control system according to claim 5, further including a load sensor for detecting the load on the engine, said valve opening and closing means comprising means for increasing the stroke by which the intake and exhaust valves are opened and closed, in response to an increase in the load on the engine as detected by said load sensor.

8. An electromagnetic valve control system according to claim 5, wherein said valve opening and closing means comprises means for attracting said magnetic plate in a valve opening direction before the intake and exhaust valves are seated, whereby shocks produced when the intake and exhaust valves are seated are lessened.

9. An electromagnetic valve control system according to claim 1, wherein said fixed magnetic poles comprise a pair of magnetic poles of unlike polarities.

10. An electromagnetic valve control system according to claim 1, wherein said intake valve is made of a ceramic material.

11. An electromagnetic valve control system according to claim 5, wherein said intake and exhaust valves are made of a ceramic material.

12. An electromagnetic valve control system according to claim 2, further including a load sensor for detecting the load on the engine, said valve opening and closing means comprising means for increasing the stroke by which the intake valve is opened and closed, in response to an increase in the load on the engine as detected by said load sensor.

13. An electromagnetic valve control system according to claim 6, further including a load sensor for detecting the load on the engine, said valve opening and closing means for increasing the stroke by which the intake and exhaust valves are opened and closed, in response to an increase in the load on the engine as detected by said load sensor.

14. An electromagnetic valve control system according to claim 5, wherein said fixed magnetic poles comprise a pair of magnetic poles of unlike polarities.

* * * * *

UNITED STATES PATENT AND TRADEMARK OFFICE
CERTIFICATE OF CORRECTION

PATENT NO. : 4,942,851

DATED : July 24, 1990

INVENTOR(S) : Hideo Kawamura

It is certified that error appears in the above-identified patent and that said Letters Patent is hereby corrected as shown below:

TITLE PAGE: [73] Assignee, please delete this section and insert the following new section:

--[73] Assignee: Isuzu Ceramics Research Institute Co., Ltd., Fujisawa, Japan--.

[56[ References Cited:

line 4, "Long ........132/90.51" should be --Long ......123/90.51--;

line 6, "Pischinger et al. .....132/90.11" should be --Pischinger et al. ...123/90.11--.

Signed and Sealed this

Fourteenth Day of January, 1992

Attest:

HARRY F. MANBECK, JR.

Attesting Officer     Commissioner of Patents and Trademarks